United States Patent [19]

Yarham et al.

[11] 4,379,072

[45] Apr. 5, 1983

[54] WATER-BASED RUST INHIBITOR

[75] Inventors: Oliver L. Yarham, Park Forest, Ill.; John M. Sech, Whiting; Carl S. Kennedy, Dyer, both of Ind.

[73] Assignee: Nalco Chemical Company, Oak Brook, Ill.

[21] Appl. No.: 309,653

[22] Filed: Oct. 8, 1981

[51] Int. Cl.$^3$ .................... C23F 11/14; C23F 11/12
[52] U.S. Cl. ............................................. 252/389 R
[58] Field of Search .................... 252/389 R, 392; 106/14.15, 14.16, 14.17; 148/6.14 R; 422/13, 16; 427/388.1; 428/457, 453

[56] References Cited

U.S. PATENT DOCUMENTS

| | | | |
|---|---|---|---|
| 2,575,276 | 4/1951 | Jacoby et al. | 252/321 |
| 3,977,994 | 8/1976 | Geiser | 252/392 |
| 4,074,013 | 2/1978 | Koch | 252/392 |
| 4,130,524 | 12/1978 | Boerwinkle | 252/392 |
| 4,233,176 | 8/1980 | Conner, Sr. | 252/392 |

*Primary Examiner*—Irwin Gluck
*Attorney, Agent, or Firm*—John G. Premo; Robert A. Miller

[57] ABSTRACT

A non-petroleum based metal corrosion inhibiting composition comprising:

| Ingredients | % by Weight |
|---|---|
| Water | 75–90 |
| Linseed Oil Fatty Acid | 2–8 |
| $C_6$–$C_{12}$ Dibasic Acid | 1–10 |
| Amine Blend, comprising a 1:2 to 2:1 ratio of a cyclic amine from the group consisting of cyclohexyl amine, morpholine and $C_2$–$C_4$ alkanol amine. | 3–8 |
| Water-soluble alkali metal base | .5–3 |

4 Claims, No Drawings

WATER-BASED RUST INHIBITOR

Metal industries and, particularly, the steel industry are plagued with the problem of corrosion, e.g., rusting of metal products, especially sheet products. With the more refined methods of producing higher grade steel sheets for use in automobiles, appliances, and allied industries, the problem of rusting during the manufacturing process, storage, and shipment has become a significant one.

Prior art inhibitors for protecting metals rely on the use of inhibitors which are in a hydrocarbon oil base. These products are effective to some extent; however, the presence of oils can cause problems in subsequent cleaning operations. Also, such products tend to run off the metal surfaces and cause housekeeping and safety problems. Further, if these coated surfaces are exposed to elevated temperatures, the oils tend to oxidize or burn and produce noxious odors.

One proposal for avoiding oil-based inhibitors is shown in U.S. Pat. No. 4,233,176. This patent shows inhibitor composition comprising water, benzoic acid, and amine salts, fatty acids, and a small amount of a petroleum oil lubricant. These products are effective under certain types of corrosive conditions but are not entirely satisfactory insofar as providing complete protection and providing lubricity to the treated surface.

The Compositions of the Invention

The compositions of the invention are set forth below in General Formula.

General Formula

| Ingredients | % By Weight General | % By Weight Preferred |
|---|---|---|
| Water | 75–90 | 80–90 |
| $C_{10}$–$C_{22}$ Aliphatic Carboxylic Acid | 2–8 | 3–6 |
| $C_6$–$C_{12}$ Dibasic Acid | 1–10 | 3–8 |
| Amine Blend, comprising a 1:2 to 2:1 ratio of a cyclic amine from the group consisting of cyclohexyl amine and morpholine and an $C_2$–$C_4$ alkanol amine. | 3–8 | 4–8 |
| Water-soluble alkali metal base. | .5–3 | .5–2 |

The Dibasic Acids

These acids may be selected from dibasic acids containing between 6–12 carbon atoms. Illustrative are such acids as adipic, pimelic, suberic, azelaic and sebacic. Of these acids, azelaic acid is preferred.

The Amine Blend

The amine blend used to prepare the compositions is a 2:1 to 1:2 blend of the cyclic amines, morpholine or cyclohexyl amine with a lower $C_2$–$C_4$ alkanol amine.

Morpholine is the preferred cyclic amine.

The lower alkanol amines may be selected from any number of such compounds. Typical are the mono, di, and triethanolamine. Preferred is monoethanolamine.

The Alkali Metal Base

This compound may be either the alkali metal hydroxide, carbonate or other basic alkali metal material capable of forming a salt with a carboxylic acid.

Optional Ingredients

The General Formula shows the basic components of the composition of the invention. It should be noted, however, that other ingredients may be added to enhance the performance and characteristics of products falling within the scope of the invention. Thus, it has been found beneficial to add to formulas of the types shown above small quantities of caprylic acid to provide clarity and viscosity control. The amount added may range between 0.3–1%. by weight.

Another optional ingredient is a fatty substituted sarcosine.[1] Such a product is sold under the trade name of Sarkosyl-O and is oleyl sarcosine. Sarcosine is N-methylglycine.

[1] Corrosion inhibitor and is used at 0.1–1% by weight.

Another optional ingredient that may be incorporated into the formulas of the inventions are the well-known mixed Ucon lubricant anti-foams which are random copolymers of ethylene oxide and propylene oxide. They are described in U.S. Pat. No. 2,575,276.

When used, the dosage may range between 0.01–1% by weight.

Evaluation of the Invention

In order to evaluate the invention, several field tests were run using a typical composition of the invention. This composition is set forth below:

| Composition A | |
|---|---|
| Ingredients | % By Weight |
| Water - Deionized | 84.8% |
| Morpholine, Anhydrous | 2.0% |
| Azelaic Acid | 4.0% |
| Caprylic Acid | 0.8% |
| Oleyl Sarcosine | 0.5% |
| Monoethanolamine, 99 o/o | 3.0% |
| Linseed Fatty Acid | 4.0% |

A trial of Composition A above and several other water-based rust preventitives was held at a Temper Mill located in a midwest area of the United States. In addition to the water-based products, two oil-based, rust preventatives were evaluated. All coils were wet-temper rolled, using a 5% solution of a commercial rolling lubricant. A single coil was divided into 10 equal parts, each weighing about 400 to 500 pounds. Each product would coat two coils.

The oil based products were sprayed first and no significant differences were seen. The spray system was then flushed with a chlorinated solvent, followed by water which was followed by a water-based competitive product hereinafter referred to as Competitive Product B.

The Competitive Product B sprayed well and seemed to wet well; however, it foamed heavily as it was sprayed. A second competitive product, hereinafter referred to as Competitive Product A, was a milky solution having a viscosity about the same as water. The Competitive Product A did not foam extensively; however, it did not seem to wet the strip well. The Composition A was sprayed last. Wetability of the strip was excellent.

The coils were immediately recoiled and samples were taken. The Competitive Product A material, as suspected, did not wet well. The Composition A wetability was judged the best by all observing.

The Competitive Product A dried the fastest; the outer lap was dry in less than 15 minutes. The Competitive Product B and Composition A dried at about the same rate; the outer laps being dry in 30 to 45 minutes. All coils were kept in the coil storage area, covered by paper, for two (2) months. They were then evaluated for rust by recoiling.

At the end of two (2) months, both coils of Competitive Product B had the same appearance; heavy stain and rust. The stain ran in from the edges, sometimes reaching the center of the sheet and continuing through the entire coil. A heavy black band of oxidation, 12 inches in from one side, ran the length of the coil.

The Competitive Product A coils had less stain and it was less severe. The stain ran in patches 10 inches in from one edge and was yellow in color. The stain ran through the entire coil. When the stain was removed, the surface was found to be etched. Mill personnel said both products were definitely unacceptable.

The Composition A coils appeared bright with no evidence of rust or stain. The Competitive Product A coils had a dull oxidized finish. Both coils had the same appearance. Mill personnel were very impressed with the coils. All coils were saved in the finished coil warehouse.

In addition to the rust preventive testing, the Temper Mill tested the Composition A at a 3% dilution. The lubricity and rollability was excellent and no problems were encountered.

In addition to the above field test, the Composition A was subjected to a so-called Stack test and the Cleveland Condensing Cabinet test. These tests are described below:

Stack Test

Standard 4"×6" "Q"-panels are cleaned by dipping in isopropanol and allowed to drain dry. The panels are then coated with the rust preventive by dipping. The panels are allowed to drain for two hours, then placed into a pack and secured with four "C" clamps. The pack is placed into a standard humidity cabinet (100° F.-100% RH) and evaluated every seven days. The amount of rust or stain after three weeks is noted. If no rust is found, the test is continued for five weeks.

Cleveland Condensing Cabinet

"Q"-panels are cleaned with isopropanol and allowed to drain dry. The panels are coated with a draw bar giving five mils wet film thickness of rust preventive. The panels are allowed to dry for two hours and then placed in the cabinet. The Cleveland test cabinet is maintained at maximum temperature for the wet and dry cycles and is operated on a four-hour cycle. The panels are evaluated after 24 hours and the amount of rust is noted.

Additionally, Composition A was subjected to hydrochloric acid fumes for four hours. The results of these tests are as follows:

In the Cleveland cabinet test, Composition A prevented rust for 48 hours.

In the Stack stain test, the specimen will be free from stain after two weeks.

In the hydrochloric acid fume test, after four hours only 10% of rust will have become evident.

Having thus described our invention, it is claimed as follows:

1. A non-petroleum based metal corrosion inhibiting composition comprising:

| Ingredients | % by Weight |
| --- | --- |
| Water | 75–90 |
| Linseed Oil Fatty Acid | 2–8 |
| $C_6$–$C_{12}$ Dibasic Acid | 1–10 |
| Amine Blend, comprising a 1:2 to 2:1 ratio of a cyclic amine from the group consisting of cyclohexyl amine, morpholine and $C_2$–$C_4$ alkanol amine. | 3–8 |
| Water-soluble alkali metal base | .5–3 |

2. A non-petroleum based metal corrosion inhibiting composition comprising:

| Ingredients | % By Weight |
| --- | --- |
| Water | 80–90 |
| Linseed Oil Fatty Acid | 3–6 |
| Amine Blend, comprising a 1:2 to 2:1 ratio of a cyclic amine from the group consisting of cyclohexyl amine, morpholine and $C_2$–$C_4$ alkanol amine. | 4–8 |
| Water-soluble alkali metal base | .5–2 |

3. The composition of claim 1 wherein the amine blend is a blend of morpholine and monoethanolamine.

4. The composition of claim 2 wherein the amine blend is a blend of morpholine and monoethanolamine.

* * * * *